(12) United States Patent
Cohen et al.

(10) Patent No.: US 7,688,743 B2
(45) Date of Patent: Mar. 30, 2010

(54) TRACING ROUTING DIFFERENCES

(75) Inventors: Alain J. Cohen, Washington, DC (US); Pradeep K. Singh, Arlington, VA (US); Vinod Jeyachandran, Rockville, MD (US); Nitin Gupta, Chevy Chase, MD (US)

(73) Assignee: OPNET Technologies, Inc., Bethesda, MD (US)

( * ) Notice: Subject to any disclaimer, the term of this patent is extended or adjusted under 35 U.S.C. 154(b) by 513 days.

(21) Appl. No.: 11/494,692

(22) Filed: Jul. 27, 2006

(65) Prior Publication Data

US 2007/0025328 A1 Feb. 1, 2007

Related U.S. Application Data

(60) Provisional application No. 60/703,583, filed on Jul. 29, 2005.

(51) Int. Cl.
*H04L 12/26* (2006.01)
*H04L 12/28* (2006.01)

(52) U.S. Cl. .................. 370/245; 370/252; 370/389

(58) Field of Classification Search .............. None
See application file for complete search history.

(56) References Cited

U.S. PATENT DOCUMENTS

| | | | | |
|---|---|---|---|---|
| 5,414,641 A | * | 5/1995 | Shinoaki et al. | 702/47 |
| 6,691,169 B1 | * | 2/2004 | D'Souza | 709/242 |
| 6,909,696 B1 | * | 6/2005 | Zavgren, Jr. | 370/245 |
| 6,976,087 B1 | * | 12/2005 | Westfall et al. | 709/238 |
| 7,286,468 B2 | * | 10/2007 | Scudder et al. | 370/219 |
| 2006/0023860 A1 | * | 2/2006 | Armanino et al. | 379/221.01 |

* cited by examiner

*Primary Examiner*—Steven H Nguyen
(74) *Attorney, Agent, or Firm*—Robert M. McDermott, Esq.

(57) ABSTRACT

A routing validation method and system identifies routers that are likely to be the cause of differences in forwarding tables associated with two versions of a network. Each destination sub-network prefix is processed to identify all the routers that exhibit differences in their forwarding table for this prefix. Each router exhibiting a difference is assessed to determine whether the difference may have been propagated to this router from another router. If the difference could not have been propagated from another router, this router is identified as a potential source of the observed difference. By eliminating routers that could have received the effects of the differences from another router, the task of identifying the root cause of the observed differences is substantially reduced in complexity.

14 Claims, 5 Drawing Sheets

```
ROUTER A                    ─ 171
Baseline:  X, P, F, 3       ─ 271
New1:      X, P, D, 4       ─ 181
Baseline:  Y, P, F, 2       ─ 281
New1:      Y, P, B, 2
ROUTER B                    ─ 172
Baseline:  X, P, A, 4       ─ 272
New1:      X, P, A, 5
ROUTER C
ROUTER D
ROUTER E
ROUTER F                    ─ 161
Baseline:  W, P, A, 3       ─ 261
New1:      W, P, D, 4
ROUTER G                    ─ 173
Baseline:  X, P, B, 5       ─ 273
New1:      X, P, B, 6
ROUTER H                    ─ 174
Baseline:  X, P, B, 6       ─ 274
New1:      X, P, B, 7
```

FIG. 3A

```
ROUTER A
Baseline:  Y, P, F, 2
New2:      Y, P, B, 2
ROUTER B
ROUTER C
ROUTER D
Baseline:  Y, P, F, 1
New2:      Y, P, F, 5
ROUTER E
Baseline:  Y, P, D, 2
New2:      Y, P, C, 5
ROUTER F
Baseline:  Y, P, F, 0
New2:      Y, P, A, 4
ROUTER G
ROUTER H
```

FIG. 3B

```
ROUTER A
Baseline:  Z, P, C, 3
New3:      Z, P, F, 4
ROUTER B
Baseline:  Z, P, A, 4
New3:      Z, P, A, 5
ROUTER C
Baseline:  X, P, E, 3
New3:      X, P, A, 4
Baseline:  Z, P, E, 2
New3:      Z, P, A, 5
ROUTER D
Baseline:  W, P, E, 3
New3:      W, P, F, 4
ROUTER E
Baseline:  W, P, C, 2
New3:      W, P, D, 5
ROUTER F
ROUTER G
Baseline:  Z, P, B, 5
New3:      Z, P, B, 6
ROUTER H
Baseline:  Z, P, B, 6
New3:      Z, P, B, 7
```

FIG. 3C

```
ROUTER A
ROUTER B
Baseline:  W, P, A, 2
New4:
Baseline:  X, P, A, 4
New4:
Baseline:  Z, P, A, 4
New4:
ROUTER C
Baseline:  Y, P, A, 3
New4:      Y, P, E, 4
ROUTER D
ROUTER E
ROUTER F
Baseline:  W, P, A, 3
New4:      W, P, D, 4
ROUTER G
Baseline:  W, P, B, 3
New4:
Baseline:  X, P, B, 5
New4:
Baseline:  Z, P, B, 5
New4:
ROUTER H
Baseline:  W, P, B, 4
New4:
Baseline:  X, P, B, 6
New4:
Baseline:  Z, P, B, 6
New4:
```

FIG. 3D

```
ROUTER A
Baseline:  Z, P, C, 3
New5:      Z, P, I, 2
ROUTER B
Baseline:  Z, P, A, 4
New5:      Z, P, A, 3
ROUTER C
ROUTER D
ROUTER E
ROUTER F
ROUTER G
Baseline:  Z, P, B, 5
New5:      Z, P, B, 4
ROUTER H
Baseline:  Z, P, B, 6
New5:      Z, P, B, 5
ROUTER I
New5:      W, P, A, 2
New5:      X, P, E, 2
New5:      Y, P, A, 3
New5:      Z, P, E, 1
```

TRACING ROUTING DIFFERENCES

This application claims the benefit of U.S. Provisional Patent Application 60/703,583, filed 29 Jul. 2005.

BACKGROUND AND SUMMARY OF THE INVENTION

This invention relates to the field of communication systems, and in particular to networks and network management.

Routers are used in networks to forward messages from one node to another in the network until the message reaches its intended destination. Routers use "forwarding tables", or "routing tables" to facilitate the determination of the appropriate node to forward each message. For ease of reference, the term 'router' is used herein to refer to any device or system that is used to forward messages based on an address associated with the communication, including communication switches and the like. In like manner, the terms 'forwarding table' or 'routing table' are used herein to refer to any directives or indices that the router uses to select a communication path for each message or group of messages, regardless of whether these directives or indices are in the form of a table, and include, for example, virtual routing tables, forwarding information bases (FIBs), and so on.

Figure 1A:
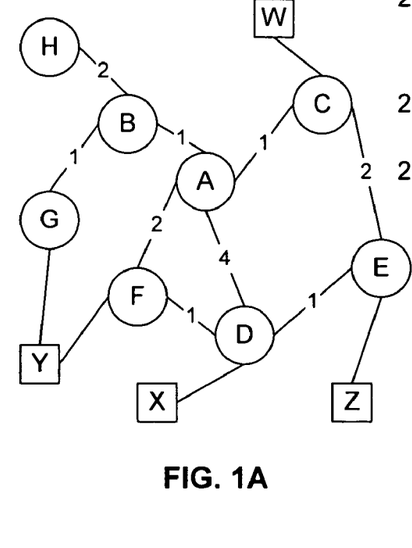
FIG. 1A illustrates an example diagram of a network.
Figure 1B:
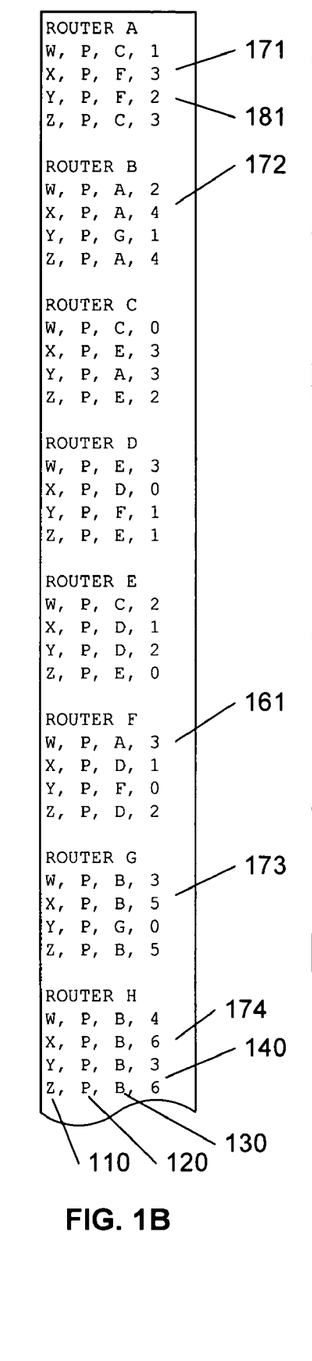
FIG. 1B illustrates an example set of forwarding tables corresponding to this example network.

FIG. 1A illustrates an example network, and FIG. 1B illustrates an example set of forwarding tables corresponding to this network. In this example, circles are used to indicate routers, and squares are used to indicate destination sub-networks. As illustrated in FIG. 1B, each entry in each router's forwarding table includes a prefix 110, a source protocol 120, a next hop 130, and a metric 140. In the example forwarding table, symbols A-H are used to indicate the addresses of the routers, and W-Z are used to indicate the sub-network prefix addresses. In an actual forwarding table, actual addresses, such as an IP address, would appear. In like manner, the symbol P is used to indicate a protocol, although the actual protocol, such as "OSPF" or "BGP" would appear in an actual forwarding table. Other information may also appear in a forwarding table.

The prefix 110 is the network address corresponding to a range of destination addresses. The source protocol 120 is the communication protocol for use of this entry in the forwarding table. The next hop 130 identifies the router to which the message will be transmitted if this entry is used. The metric 140 identifies the "cost" associated with transmitting the message to the destination if this entry is used. In the example of FIG. 1A, the links between routers include a figure that represents the example cost of communicating a message unit between the routers. For example, to send a message unit between routers A and B, the cost is "1", whereas to send a message between routers A and F, the cost is "2". Also in this example, the cost of communications between a sub-network and its supporting router is assumed to be zero.

Typically, each router broadcasts its forwarding table to each of its neighbors. The receiving router updates its forwarding table based on the entries of each of the received other forwarding tables. The cost of using each route in a neighbor's forwarding table is determined from the neighbor's metric entry 140, plus the cost of reaching that neighbor. If the received network prefix 110 is not in the receiving router's forwarding table, it is added, using this determined cost as the metric 140, and an identifier of the neighbor that provided this entry as the next hop 130. If the network prefix 110 is already in the receiving router's forwarding table, the newly created entry replaces the existing entry if the metric 140 of the new entry is less than the metric 140 of the existing entry. Optionally, a router may be configured to maintain multiple forwarding table entries for the same destination, using additional criteria beyond the metric 140.

Once a network is established, all of the forwarding tables achieve a 'steady state' condition, wherein each router includes the lowest cost routing entry for each destination reachable by the router. This steady state does not change unless and until a change occurs in the network. Such changes may be intentional or unintentional, where unintentional changes include mistaken or unintentional reconfigurations of routing parameters, undetected component or link failures, and so on. For ease of reference, purposeful changes that are not reported to or recorded by a network manager, or other party responsible for monitoring network performance, are considered unintentional changes. Forwarding table changes caused by intentional or unintentional changes to the network can lead to degradations in network performance, but because of the dynamics associated with propagating forwarding table entries throughout a network, the cause of such degradation is often difficult to determine.

It is an objective of this invention to facilitate the diagnosis of network performance changes. It is a further objective of this invention to facilitate the identification of the source or cause of a network change. It is a further objective of this invention to facilitate an identification of the originator(s) of detected differences in routing forwarding tables in the network.

These objectives and others are achieved by a method and system that compares the forwarding tables associated with routers in two versions of a network to identify changes. The method and system facilitate the identification of routers that are likely to be the cause of the differences in these forwarding tables. Each destination sub-network prefix is processed to identify all the routers that exhibit differences in their forwarding table for this prefix. Each router exhibiting a difference is assessed to determine whether the difference may have been propagated to this router from another router. If the difference could not have been propagated from another router, the router is identified as a potential source of the observed difference. By eliminating routers that could have received the effects of the differences from another router, the task of identifying the root cause of the observed differences is substantially reduced in complexity.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail. In the following description, the term "packet" is used herein to indicate a message unit, although the principles of this invention are not limited to packet communications, per se.

Conventional routing protocols are purposely designed to be robust, and provide for dynamic updating of the routing tables when faults occur. This invention is based on the premise that an analysis of changes to the routing tables of a network can facilitate the diagnosis of network performance changes. Often, a network's performance degrades gradually over time, to the point that the performance becomes unacceptable; but, because of the fault-masking provided by dynamic routing protocols, the cause(s) of the problem may not be readily apparent.

Copending U.S. patent application Ser. No. 11/494,441, "ROUTING VALIDATION", filed concurrently with this application for Alain J. Cohen, Pradeep K. Singh, Vinod Jeyachandran, and Nitin Gupta, teaches techniques for efficiently capturing and comparing routing tables from two versions of a network, and is incorporated by reference herein. In this copending application, the network may be modeled in a network simulator, to predict the performance of the network before it is installed, to predict the effects of intentional changes, determine causes of network bottlenecks, and so on. Such modeling includes the simulation of the model using an assumed or determined forwarding table for each modeled router. When the actual network's performance does not match the simulated model's performance, the disclosed system can be used to compare the steady state condition of the routers in the actual network to the simulated steady state condition of the modeled network to determine the cause of the difference. In this example, the simulated network's forwarding tables can be considered the "ideal" to which the actual forward tables are compared, because it is assumed that the models of the router accurately reflect the algorithms used in the actual routers, and that all of the modeled communication links and components are operation. If a difference is detected between the forwarding tables, it must be due to an actual communication link or component not performing properly. Alternatively, the forwarding tables from the actual network collected at two different times can be compared, to identify any changes introduced between those times.

The detection of a change in the forwarding table can serve as a detection of a potential fault in the network, for which the routers have compensated. However, a simple comparison of the forwarding tables in a complex network will generally be insufficient for fault isolation, because the effects of an original forwarding table change are propagated throughout the network, often causing forwarding table changes at multiple routers, with no clear indication of where these changes originated. Further complicating the matter, the nature of the change can have varying effects. A network change may cause a change of each of the different entries in a forwarding table entry; it may cause a deletion of the forwarding table entry; or, it may cause an addition of a forwarding table entry.

Figure 2A:
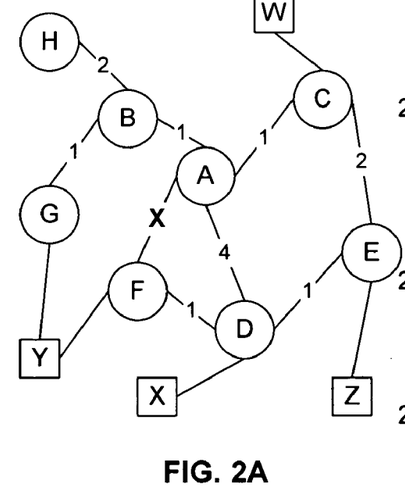
FIG. 2A illustrates an example diagram of a change to the network of FIG. 1A.
Figure 2B:
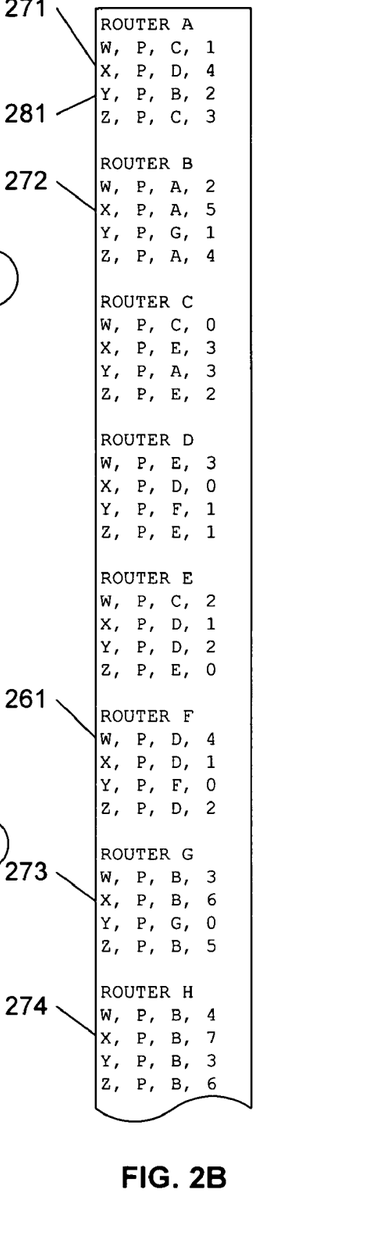
FIG. 2B illustrates an example set of forwarding tables corresponding to this changed network.

FIG. 2A illustrates a change to the network of FIG. 1A, wherein the link between router A and router F is removed, for example, due to a failure of a component in that link. The corresponding steady-state condition of the forwarding tables in each router is illustrated in FIG. 2B. Both routers A and F illustrate changes 171/271, 181/281, 161/261 to their forwarding tables, and routers B, G, and H also illustrate changes 172/272, 173/273, 174/274 caused by this change at routers A and F.

Figures 3A, 3B:
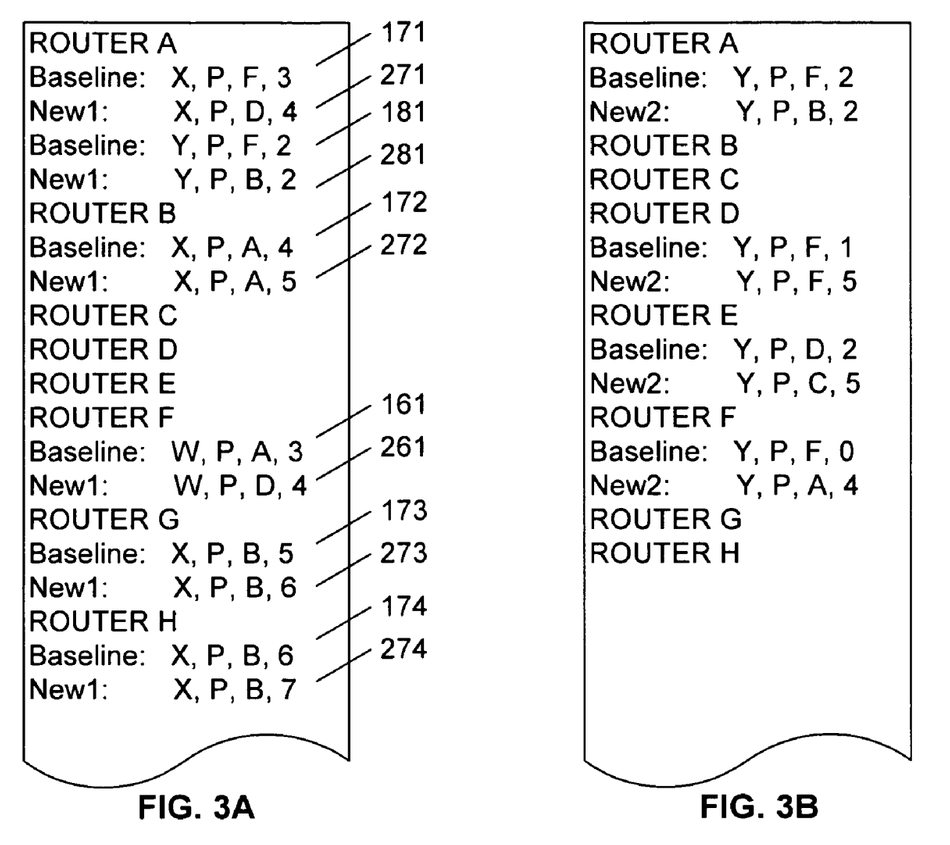
FIGS. 3A-3E illustrate comparisons of sets of forwarding tables for a variety of changes to the network of FIG. 1A.

A direct comparison of the forwarding tables (FIG. 1B) corresponding to the baseline network of FIG. 1A and the forwarding tables (FIG. 2B) corresponding to the modified network of FIG. 2A, is illustrated in FIG. 3A. As illustrated in FIG. 3A, this direct comparison of the forwarding tables of two versions of a common network does not immediately indicate where the network change has occurred.

FIGS. 3A-3E illustrate a listing of differences among forwarding tables corresponding to a variety of changes to the network of FIG. 1A. As noted above, FIG. 3A illustrates the differences of forwarding tables corresponding to a failure between routers A and F. FIG. 3A illustrates changes in the forwarding tables of routers A, B, F, G, and H, and it is an objective of this invention to assess such differences to eliminate routers that are not likely to be the source of the observed differences in FIG. 3A.

The techniques of this invention are generally based on the observation that any changes to a router's forwarding table either originate at the router, or are caused by the information received from other routers. Although a change may also be caused by a combination of a change originated at the router and a change propagated from neighboring routers, the likelihood of simultaneous different sources of a common change is deemed substantially unlikely. Thus, if a change can be attributed to another router, the instant router is assumed to have "learned" of this change from the other router, when the forwarding tables are communicated among the routers, and the instant router is not considered to be the source of the change. Alternatively stated, all routers are considered non-sources of changes until it is determined that the router could not have learned of this change from another router, as detailed further below.

Figure 4:
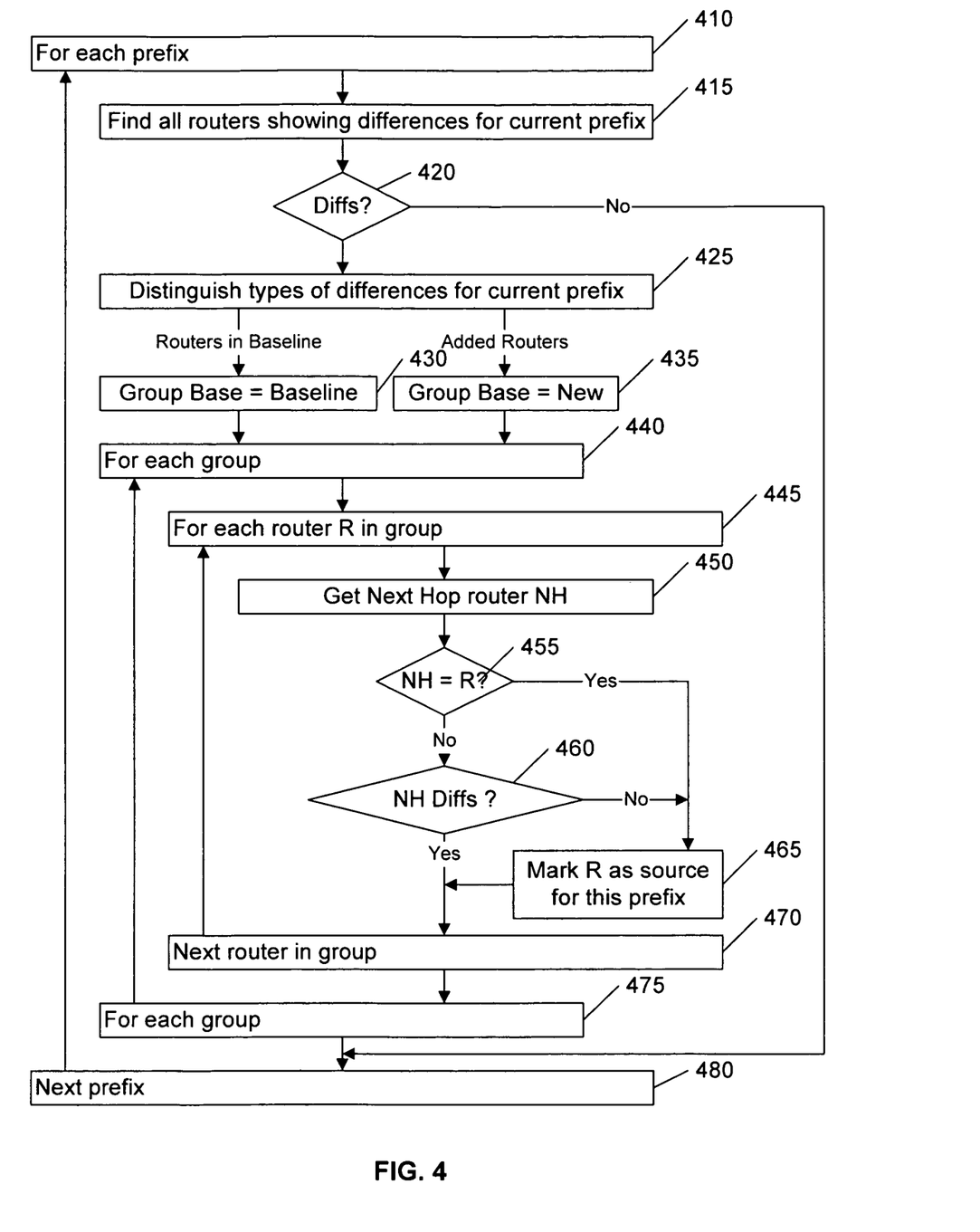
FIG. 4 illustrates an example flow diagram of a routing table comparison process in accordance with this invention.

FIG. 4 illustrates an example flow diagram for comparing two sets of forwarding tables to identify the sources of changes between the sets. For convenience, one of the sets is identified as the 'baseline' set, which is typically the older of the two sets, and the other set is termed the 'new' set. The loop 410-480 is structured to provide a prefix-centric analysis of the forwarding tables, by analyzing changes to the routes associated with each prefix independently. In a complex network, multiple independent faults or other changes to the network may occur concurrently; however, it is relatively unlikely that a single prefix will be concurrently affected by multiple changes. Therefore analyzing the changes to the routes associated with each prefix increases the likelihood of identifying the source of each change.

For the current prefix, all routers that exhibit a difference in their forwarding tables for messages having this destination sub-network prefix are identified, at 415; if, at 420, no routers show a difference for this prefix, the next prefix is processed via 480.

For ease of understanding, the differences illustrated in FIG. 3A will be used to demonstrate the operation of this flow diagram. In FIG. 3A, prefixes W, X, and Y exhibit differences.

For prefix W, router F exhibits a difference in its forwarding table; for prefix X, routers A, B, G, and H exhibit differences; and, for prefix Y, router A exhibits a difference.

If, at 420, a difference is found in the routing tables for this prefix, the type of difference is assessed, at 425, to determine whether the difference is an addition of one or more routers in the new set of routers for this prefix. This difference type segregates routers into two groups (existing routers, and added routers), and determines which set of forwarding tables is used as the basis for comparison. Generally, the baseline set is used as the base for comparison, at 430, but for the group of routers in the new set for this prefix having no entries in the baseline set, the new set of forwarding tables is used as the base, at 435. The loop 440-475 processes each group of routers for each prefix.

In the example of FIG. 3A, there are no added routers in the new set, compared to the baseline set, and therefore the second group (added routers) is empty.

The loop 445-470 processes each router, R, in each group, if any, for each prefix exhibiting a difference. As noted above, each router is initially assumed not to be the source of the differences in the routing tables, and this loop 445-470 is structured to identify routers that are the likely sources of the differences for the current prefix.

At 450, the next hop, NH, for this prefix in the router's base forwarding table is identified, and this next hop router NH is assessed to determine whether it is the 'source router' for this prefix, at 455-460. If the next hop router is the current router being analyzed, at 455, this indicates that the router is directly supporting the prefix sub-network (i.e. there is no "next" router to which this router forwards a message with this prefix). Therefore, any change in this router's forwarding table for this prefix must have originated at this router, and the router is identified as a "source router" for this prefix, at 465. In like manner, if, at 460, the next hop router NH does not show a difference in its forwarding table for this prefix, then the current router R could not have "learned" of this difference from the next hop router, and therefore must have originated this difference, and is marked as a "source router" for this prefix, at 465.

For prefix W of FIG. 3A, only router F exhibits a difference 161/261. In the baseline forwarding table of FIG. 1B, router F indicates 161 a next-hop entry of router A, and a metric of "3" for this prefix W. In the new forwarding table of FIG. 2B, router F indicates 261 a next-hop entry of router D, and a metric of "4" for this prefix W. As illustrated in FIG. 1A, messages from F to W are routed through router A; but, when the link between A and F is severed, as in FIG. 2A, messages from F to W must be routed through router D, with a cumulative routing cost of "4".

With regard to the operation of blocks 450-455-460-465 in FIG. 4 on the differences identified in FIG. 3A, router F's baseline forwarding table entry 161 identifies router A as the next hop router for prefix W. At 455, router A is not the current router F, and the flow continues to 460. At 460, router A shows no difference for prefix W between the baseline set and the new set, and therefore the change of next-hop and metric entries in router F's forwarding table must have originated at router F, and router F is marked as a 'source router' for prefix W, at 465. Because router F is the sole router in the first group (existing routers) for prefix W, the loop 445-470 terminates; and, because there are no routers in the second group (new routers) for prefix W, the loop 440-475 terminates, and the next prefix is analyzed, via the loop 410-480.

For prefix X of FIG. 3A, routers A, B, G, and H exhibit differences 171/271, 172/272, 173/273/, 174/274, respectively, in their forwarding tables. When the link between A and F is severed, as illustrated in FIG. 2A, router A must route messages to prefix X via the more costly link to router D, and routers B, G, and H must each use this higher cost route.

Referring to the operation of the example flow diagram of FIG. 4 for prefix X, at 410, these routers A, B, G, and H are identified 415, and each of these routers appear in the baseline forwarding tables 430, and there are noadded routers for prefix X, at 435.

For router A, at 450, the base entry 171 identifies router F as the next hop for prefix X. At 460, router F does not indicate a change for the routing for prefix X, and therefore, router A could not have learned this change from router F, and is marked as a "source router" for prefix X at 465.

For router B, at 450, the base entry 172 identifies router A as the next hop for prefix X. At 460, router A indicates a change 171 for the routing for prefix X, and therefore B likely learned the difference from router A, and is not identified as a "source router" for prefix X.

In like manner, for routers G and H, the base entries 173 and 174 identify router B as the next hop for prefix X, and, at 460, router B indicates a change 172 for the routing of prefix X; therefore routers G and H likely learned the change from router B, and are not identified as "source routers".

For prefix Y, at 410-415, router A is identified as the sole router that indicates a change for prefix Y. When the blocks 410-480 are executed for prefix Y, router A's next hop in the baseline forwarding table entry 181 for prefix Y is identified as router F. For this prefix Y, router F does not indicate a difference in its forwarding table, and thus router A could not have learned of this change from router F, and router A is identified as a "source router" for prefix Y, at 465.

For prefix Z, at 410-415, no routers indicate a difference, and therefore, at 420, the flow branches to block 480; and, because prefix Z is the last prefix, the loop 410-480 terminates.

As this example demonstrates, by processing the comparison of the baseline and new forwarding tables relative to each prefix, routers A and F are identified as source routers for the observed changes. As noted above, multiple faults could have caused the changes in the routing tables, and the identification of routers A and F as source routers could be indicative of independent faults. However, due to the fact that there is a common connection between routers A and F, these results would suggest to a network manager that there is likely a problem that directly affects routers A and F, such as the illustrated break in the routing link between routers A and F in FIG. 2B.

In FIG. 3B, prefix Y exhibits changes in the forwarding tables of routers A, D, E, and F. Upon execution of the flow diagram of FIG. 4, routers A, D, and E are not identified as "source routers" for prefix Y, because each of the forwarding table entries for these routers identify router F as the next hop router, and, at 460, router F is identified as exhibiting a difference for prefix Y, and therefore these routers A, D, and E could have learned the difference from router F. Router F, on the other hand, is identified as a "source router" for prefix Y, based on the comparison at 455, identifying router F as the next hop in the baseline forwarding tables for prefix Y. As noted above, if the forwarding entry identifies the current router as the next hop router, then the message is not transmitted to another router and is locally provided to the sub-network with the given prefix, as illustrated by the link between router F and prefix Y in FIG. 1A. After processing the changes reported in FIG. 3B, router F is identified as the "source router" for this change to the forwarding of messages addressed to prefix F, which would lead a network manage to conclude that the link between router F and sub-network prefix Y is cause by a problem at node F.

Figure 3C:
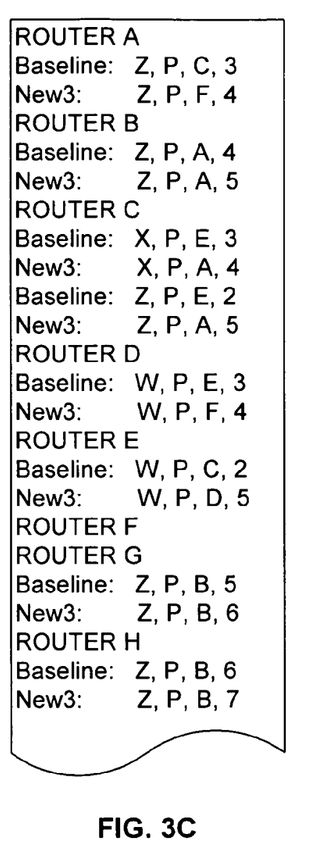

In FIG. 3C, router C is the sole route with a change to prefix X, and is therefore a "source router" for prefix X. For prefix W, router D indicates router E as a next hop, and router E indicates a difference for prefix W, and thus router D likely learned the difference from router E, as is not a "source router". Router E indicates router C as a next hop for prefix W, but router C does not indicate a change to the routing for prefix W, and therefore router E is identified as a "source router" for prefix X. For prefix Z, router A identifies router C as the next hop, and router C indicates a difference for this prefix Z; therefore router A is not identified as a "source router" for prefix Z. In like manner, router B identifies A as the next hop for prefix Z, and routers G and H identify router B as their next hop for prefix Z, and, therefore, because router A identifies a difference for prefix Z, routers B, G, and H are not identified as "source routers". Thus, applying the principles of this invention, routers C and E are identified as the "source routers" for the differences of FIG. 3C, indicating a likely problem on the link between C and E.

Figure 3D:
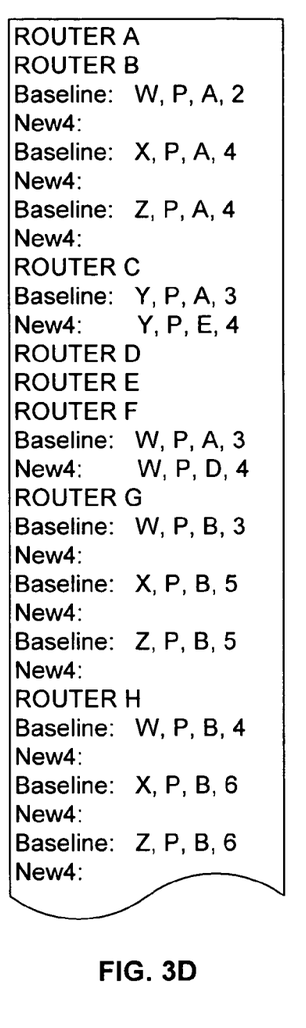

In FIG. 3D, the new forwarding tables indicate an absence of entries for prefixes W, X, and Z at routers B, G, and H, and changes to entries for prefixes Y and W at routers C and F, respectively. Applying the principles of this invention, router B identifies router A as a next hop for prefixes W, X, and Z, whereas router A does not exhibit any changes; therefore, router B is identified as a "source router" for each of these prefixes. Routers C and F are similarly identified as "source routers" for prefixes Y and W, having router A, which does not exhibit any changes, as their next hop. Routers G and H are not identified as "source routers" for prefixes W, X, or Z, because they include router B as their next hop, and router B exhibits changes for these prefixes. In this example, a network manager would likely conclude that the problem resides in router A, because router A is the central element to the loci of identified "source routers" B, C, and F, and if communication to router A has been terminated, router A would also not be able to update its forwarding table, thereby indicating no changes.

Figure 3E:
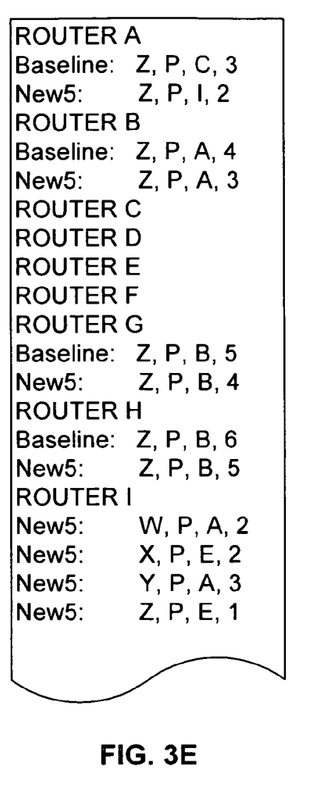

In FIG. 3E, the new forwarding tables indicate the presence of a new router, I, and changes to the forwarding tables of routers A, B, G, and H for each of the prefixes W, X, Y, and Z. Applying the principles of this invention, the existing routers A, B, G, and H are processed independently from the new router, I, for each of these prefixes (see 425-430-435, and the loop 440-475 in FIG. 4).

For the existing routers, router A is identified as a "source router" for prefix Z, because its next hop C for prefix Z does not indicate a change. This difference at router A eliminates routers B, G, and H from being identified as "source routers" for prefix Z. Router I, being the sole router indicating a change to the prefixes in the new router group, is identified as a "source router" for each of the prefixes, because none of the next hop routers exhibit a change for the corresponding prefix. In this example, having identified routers A and I as "source routers", a network manager would likely conclude that the new router I provides an added link from router A. A further investigation, based on the observation that prefix Z is most affected, would indicate that router I is likely located between router A and router E in FIG. 1A.

Figure 5:
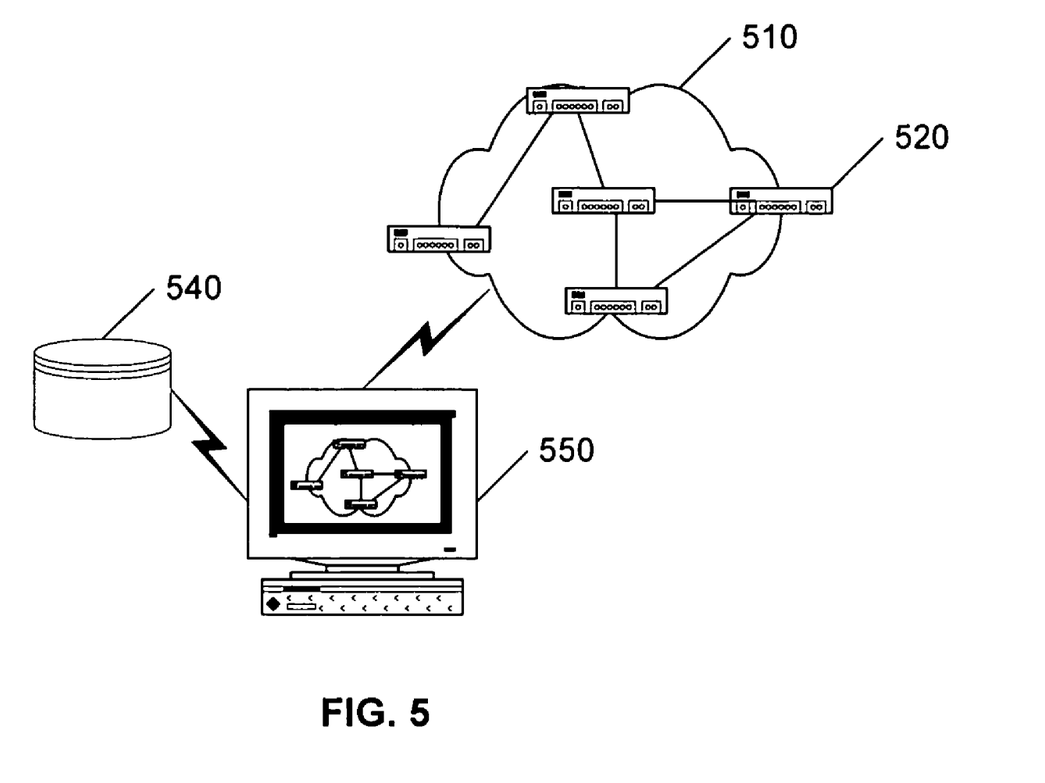
FIG. 5 illustrates an example routing validation system in accordance with this invention.

FIG. 5 illustrates an example routing validation system. A processing system 550 is preferably configured to access a network 510 comprising a plurality of routers 520, to receive a copy of each router's forwarding table. The processing system 550 can be configured to request these forwarding tables periodically, or upon demand. Preferably, the request is transmitted to all routers within a short time period, so that the set of received forwarding tables reflect a current state of the network. Alternatively, each router in the network can be configured to forward its routing table to the processing system 550 on a regular basis, such as whenever it forwards its routing table to its neighbors. Each set of received forwarding tables is preferably stored in a database 540, for subsequent retrievals and comparisons. The database 540 may also contain one or more sets of forwarding tables used for modeling the network, such as the forwarding tables used to simulate the performance of the system. The term database is used herein in the general sense, and includes any of a variety of systems or components that are configured to provide an organized storage of information, and may include, for example, a conventional file storage system accessible to the processing system 550. In like manner, a database as defined herein may be distributed among multiple storage systems, and may include, for example, web-pages accessible via the Internet.

The processing system 550 is configured to compare two sets of routing forwarding tables using the principles of this invention, such as illustrated in the flow diagram of FIG. 4. Each router that exhibits a difference between its forwarding table entries for a prefix is marked as a potential source of the difference, if its next-hop router for the prefix does not exhibit a difference in its forwarding tables for that prefix. If a graphic representation of the network 510 is available, the processing system is configured to highlight the identified source routers to facilitate diagnoses. As would be recognized by one of ordinary skill in the art, once the potential source routers are identified, additional diagnostic tools and techniques can be applied to further isolate the cause of the observed differences in the forwarding tables.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

We claim:

1. A method embodied on a network analysis system for identifying potential sources of differences between a first set of forwarding tables and a second set of forwarding tables, comprising:
   identifying, by the network analysis system, a prefix in the first set of forwarding tables,
   identifying, by the network analysis system, a first router that indicates a difference between a first entry in the first set of forwarding tables and a second entry in the second set of forwarding tables for the prefix,
   identifying, by the network analysis system, a next-hop router based on the first entry,
   identifying, by the network analysis system, the first router as a potential source of the difference between the first entry and the second entry, based on whether the next-hop router indicates a difference between entries in the first and second sets of forwarding tables for the prefix.

2. The method of claim 1, including identifying each other router that exhibits a difference between entries in the first and second sets of forwarding tables for the prefix, and identifying each other router as a potential source of the difference between the first entry and the second entry, based on whether a corresponding next-hop router indicates a difference between entries in the first and second sets of forwarding tables for the prefix.

3. The method of claim 2, including repeating the method of claim 2 for each other prefix in the first set of forwarding tables.

4. The method of claim 1, including repeating the method of claim 1 for each other prefix in the first set of forwarding tables.

5. The method of claim 1, including collecting the first set of forwarding tables from a plurality of routers forming a first state of a network, and collecting the second set of forwarding tables from a plurality of routers forming a second state of a network.

6. The method of claim 1, wherein at least one of the first and second sets of forwarding tables corresponds to a set of forwarding tables used to model performance of a network.

7. A system comprising:
   a database, and
   a processing system that is configured to:
      access a first set of forwarding tables and a second set of forwarding tables from the database,
      identify differences in entries between the first and second sets of forwarding tables, and
      identify potential sources of the differences in the entries, based on a determination of whether next-hop routers identified in the entries exhibit differences in entries between the first and second sets of forwarding tables.

8. The system of claim 7, wherein the processing system is further configured to facilitate providing at least one of the first and second set of forwarding tables to the database, from a plurality of routers forming a network.

9. The system of claim 8, wherein each router of the plurality of routers is configured to autonomously transmit its forwarding table to the processing system.

10. The system of claim 7, wherein at least one of the first and second sets of forwarding tables corresponds to a set of forwarding tables used to model performance of a network.

11. A computer program that is stored on a computer-readable medium and configured to cause a processing system to distinguish routers that are potential sources of routing discrepancies by effecting the following:
    identify a plurality of routers within a first and second set of forwarding tables as non-source routers; and
    for each prefix of a plurality of prefixes within the first set of forwarding tables:
    identifying non-source routers that exhibit different entries in the first and second sets of forwarding tables for the prefix; and
    for each non-source router that exhibits different entries:
    identify a next hop router from the entry in the first set,
    determine whether the next hop router exhibits different entries in the first and second sets of forwarding tables for the prefix, and
    if the next hop router does not exhibit different entries, identify the non-source router as one of a plurality of source routers.

12. The computer program of claim 11, which further causes the processing system to identify a non-source router as one of the plurality of source routers, if the non-source router is directly coupled to a sub-network corresponding to the prefix and exhibits different entries in the first and second sets of forwarding tables for the prefix.

13. The computer program of claim 11, which further causes the processing system to identify a non-source router as one of the plurality of source routers, if the non-source router is a sole router that exhibits different entries in the first and second sets of forwarding tables for the prefix.

14. The computer program of claim 11, which further causes the processing system to remove each non-source router that is identified as a source router from the plurality of non-source routers.

* * * * *